Aug. 6, 1963     ERICH-ARTHUR NIER     3,100,172
PROCESS FOR THE MANUFACTURING OF PLASTIC HOLLOW BODIES
Filed Sept. 15, 1959                                      3 Sheets-Sheet 1

INVENTOR

Aug. 6, 1963  ERICH-ARTHUR NIER  3,100,172
PROCESS FOR THE MANUFACTURING OF PLASTIC HOLLOW BODIES
Filed Sept. 15, 1959  3 Sheets-Sheet 2

INVENTOR

United States Patent Office 3,100,172
Patented Aug. 6, 1963

3,100,172
PROCESS FOR THE MANUFACTURING OF PLASTIC HOLLOW BODIES
Erich-Arthur Nier, Bleidenstadt, Taunus, Germany, assignor to Firm Hans Gubela, Wuppertal-Barmen, Germany
Filed Sept. 15, 1959, Ser. No. 840,195
Claims priority, application Germany Sept. 16, 1958
5 Claims. (Cl. 156—228)

This invention relates to a process for the manufacture of plastic hollow bodies.

It is well known in the art to weld plastics, for example, together by means of high frequencies. As a rule, this usually concerns the welding of plastic foils. The welding of plastic shaped parts, on the other hand, presupposes on overlapping of the parts or a welding flange along the welding seam on both sides of which the welding electrodes must be capable of being placed into position. In general, these conditions are not present in the manufacture of hollow bodies made from plastics.

In most cases, in the manufacture of re-reflectors having an airtight and watertight rear covering, for example, things are made more difficult in that the shaped parts can under no circumstances be allowed to warp during a welding process. In the re-reflectors mentioned one of the shaped parts consists, for example, of a number of re-reflecting elements (triangular elements or similar) which are injection moulded with optical accuracy and can become unusable even with only a small distortion.

The object of the present invention is to manufacture hollow bodies made from plastics of shaped parts welded together in the manufacture of which these difficulties are avoided.

According to the invention the hollow body is formed from two shaped parts which are laid one against the other each with a flange-like edge and on whose inner side there are recesses which form a hollow space running along the edge and the edges are welded together and removed after the welding process. During the welding process the plastified material is pressed into the hollow space and after the settling firmly unites both parts tightly with each other so that the edge can be removed. For this purpose it is expedient that a predetermined breaking point be produced already by means of the welding stamp. The breaking points can subsequently be smoothed in the normal manner, so that a completely smooth junction between both shaped parts is achieved.

By means of the invention it is possible to manufacture a re-reflector with a reflector body made of plastics and an airtight and watertight rear covering and whose rear covering is formed from a plastics covering plate which is welded with the reflector body. Since the union is completely airtight it is expedient that the plastics covering plate is flexible in order to equalize pressure differences, whereby it is advantageously of convex shape in the normal condition. The welded union therefore is not strained by pressure differences such as occur, for example, by heating.

In many cases it is necessary to lead guide elements or fixing elements, screws for instance, through plastic hollow bodies of this kind, whereby, however, great store is set on the fact that the sealing of the hollow space is maintained despite such recesses or fixing holes. The present invention therefore has as its object the leading of recesses, fixing holes and similar through plastic hollow bodies with the maintenance of the interior space sealing through logical use of the process described above.

According to the invention this object is accomplished in that one of the shaped parts has a lug type extension provided with a blind borehole and whose front face is welded with the other shaped part, whereby a hollow space provided in the area of the lug type extension fills with plastified material during the welding process and the bottom of the blind borehole is removed after the welding process.

The process is carried out expediently in the manner that the welding takes place between two electrodes, of which one lies in the area of the lug type extension on the outside of the one shaped part, and the other is so dimensioned that it at least fills up the deeper part of the blind borehole and lies on the bottom of the blind borehole. The shape of the blind borehole is of no importance for the process. It can be a relatively small screwhole or a sectional recess of any desired cross-section for, e.g., the introduction of functional parts.

Re-reflectors with a reflector body made from plastics and an airtight and watertight rear covering which is formed from a plastic covering plate welded to the reflector body have hitherto been mainly fixed on guide or marking posts, bridge pillars and similar by means of overlap frames, which necessitates a relatively high outlay. Compared with this it is provided in accordance with the invention that coinciding fixing holes are provided in the reflector body and the plastic covering plate, and the reflector body and the plastics covering plate are welded together with each other on the edges of the fixing holes. The plastics re-reflector can be provided in the manner described with fixing holes for screws and similar without the sealing of the hollow space between the reflector body and the plastics covering plate against the penetration of air and water being endangered by the fixing holes.

A few embodiments of the invention are depicted in the illustrations and described in the following:

Figure 1:
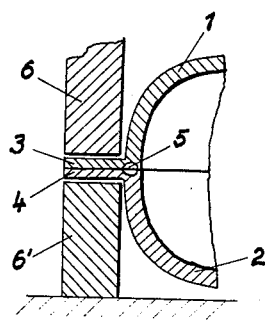
FIG. 1 shows in section a hollow body which is manufactured from two plastics shaped parts in accordance with the invention and with the welding edges lying one upon the other between two welding electrodes.
Figure 3:
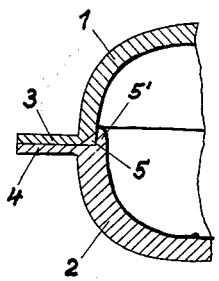
FIGS. 2 and 3 show other forms of the shaped pieces.
Figure 2:
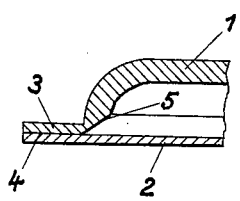
Figure 4:
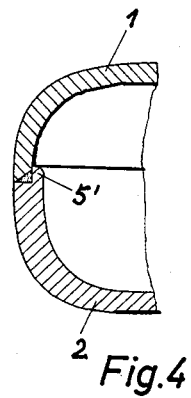

FIG. 4 likewise shows in section the hollow body according to FIG. 3 after welding.

Figure 5:
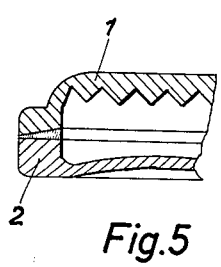

FIG. 5 shows a re-reflector which is provided in accordance with the invention with a flexible rear covering of convex shape and made from plastics.

Figure 6:
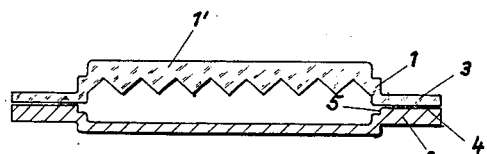
Figure 7:
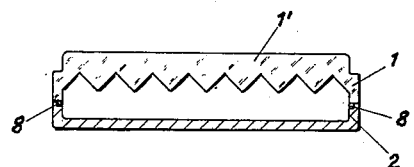
Figure 8:
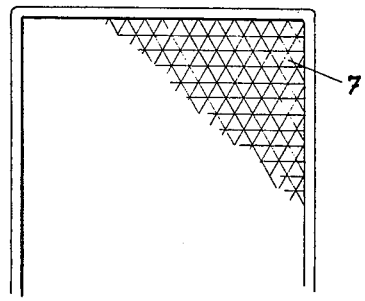

FIG. 6 shows two shaped parts in the manufacture of a re-reflector with a rear covering made of plastics, and FIGS. 7 and 8 show the finished re-reflector in section and in front view.

Figure 9:
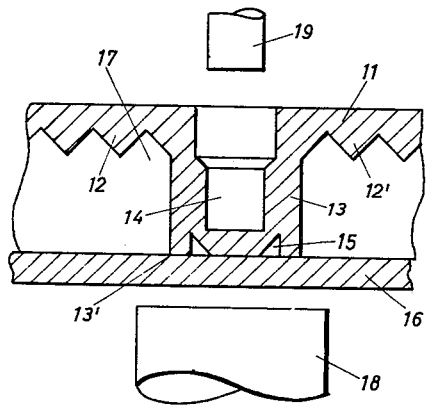
Figure 10:
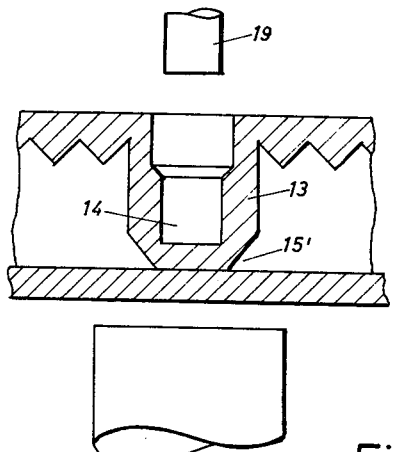

FIGS. 9 and 10 show two embodiments of the invention in which the plastics hollow body is provided with guide holes or fixing holes.

The two plastics shaped parts 1, 2 (FIGS. 1 to 6) are each provided with a flange-like edge 3, 4 (FIGS. 1 to 3, and 6). The edges 3, 4 lie one upon the other. On the inside of the edges 3, 4 the shaped parts 1, 2 or at least one of them are provided with recesses, which form a hollow space extending along the edges. In the design according to FIGS. 2, 5 and 6 the hollow space is simply open towards the inside; in the design according to FIGS. 3 and 4 it is closed by means of a collar 5' of the shaped part 2. The edge 3 and 4 are welded together in the manner indicated in FIG. 1 by means of two welding electrodes 6, 6'. The liquefied material of the edges 3, 4 is thereby pressed into the hollow spaces 5. This material hardens in the hollows spaces 5 and holds the two shaped parts 1, 2 firmly together airtight and watertight. The edges 3, 4 can now be broken off and the breaking point smoothed so that the smooth joint shown in FIGS. 4 and 7 are effected. The breaking off of the edges can be automatically effected by the welding machine, inasmuch as the welding electrodes 6, 6' still exercise a strong pressure on the edges after completion of the welding process.

To prevent tensions it is advisable that the shaped parts are warmed before the welding process. It has also proved to be advisable for the welding zone to be maintained under pressure after the welding process until the welding parts are cooled sufficiently to harden the same.

FIGS. 6, 7 and 8 show a re-reflector manufactured in accordance with this process as it is used, for example, for traffic guidance purposes. The one shaped part 1 is formed from a re-reflector body made from transparent material, the front side 1 of which is completely smooth whilst the inner side forms a number of small triangular elements 7. Acrylic resin (Plexigum) can be used as material. The rear side 2 consists of a non-transparent plate with an edge 4 which is recessed on its interior side and forms a hollow space 5 for the welding material 8 which provides the joint (FIG. 7).

It has been demonstrated that an airtight and watertight welding of the re-reflector can be achieved in this manner without any distortion of the optically accurate injection sprayed re-reflector being observed.

In 11 (FIG. 9) a reflector body made of transparent plastics is shown whose outer surface is smooth and whose inner side has prisms 12, 12' preferably to triangular shape. The re-reflector body 11 is provided with a lug type extension 13 in which a blind borehole 14 is provided. The front surface 13' of the extension 13 is provided with a circular recess 15 and lies on a plastics covering plate 16. This plastics covering plate 16 is welded in the manner described above, not shown here, on the edges with the re-reflector body 11 so that a closed airtight and watertight hollow space 17 is provided. The prisms 12, 12' therefore lie free so that these can reflect completely. On the other hand no dust or dirt layer can be deposited on the prism 12, 12'. Between a welding electrode 18 arranged on the outside of the plastics covering plate 16 and an electrode 19 which completely fills the deeper part of the blind borehole 14 a welding process takes place. The molten material is thereby squeezed into the recess 15 by the pressure of the welding electrodes 18, 19, and an internal union is formed between the plastics covering plate 16 and the front surface 13' of the extension 13. After this welding process the bottom of the blind borehole 14 remains as a relatively thin skin. One can now bore through within the welding edge of the blind borehole 14 and the plastics covering plate 16 and in this manner create a fixing hole without endangering the sealing of the hollow space 17.

In the embodiment illustrated in FIG. 10 there is a circular space 15', resulting from bevelling the extension 13, instead of the circular recess 15, and which fills with the plastified material during the welding process.

It is essential that the one electrode 19 completely fills the blind borehole 14 so that the plastified material cannot rise upwards on the electrode wall owing to the pressure of the electrode 19 but is pressed into the recess 15 or the circular space 15'.

What is claimed is:
1. A process for the manufacture of a plastic body having a hollow interior, said process comprising the steps of: forming thermoplastic mating sections to define said body with exposed portions of said bodies having faces adapted to be juxtaposed and with a recess extending along the edge of the interior side of the portions; assembling said sections in mating relationship; heating said exposed portions to soften the same and applying pressure thereto in a direction generally normal to said faces to squeeze and flow material from the portions to said interior side to at least substantially fill said recess with the material in the recess bonding the sections, whereby said exposed portions may be removed without destroying the bond between the sections.

2. The process of claim 1, wherein said portions are maintained under pressure while permitting the softened material to cool and set and thereafter removing said pressure.

3. The process of claim 1, wherein said portions are removed after the material in the recess has set.

4. The process of claim 1, wherein the sections are preheated before the step of applying heat and pressure to said portions.

5. A process for the manufacture of a hollow plastic body, said process comprising the steps of: forming a pair of thermoplastic mating sections having juxtaposed side walls, abutting flanges extending outwardly from the side walls and a recess between at least a portion of the side walls and at the interior of the line of demarcation between the flanges and the side walls; assembling said sections in mating relationship; heating said flanges to soften the same and applying pressure thereto in a direction generally normal to the flanges to squeeze and flow material from the flanges into said recess to at least substantially fill the same; cooling the material in the recess sufficiently to set the same and to bond the sections while maintaining the pressure on the flanges; and after the material has set removing the flanges with the material in the recess continuing to bond the sections into a unitary hollow body.

References Cited in the file of this patent

UNITED STATES PATENTS

| | | |
|---|---|---|
| 2,546,208 | Barton | Mar. 27, 1951 |
| 2,575,764 | Morner | Nov. 20, 1951 |
| 2,588,604 | Archer | Mar. 11, 1952 |
| 2,682,605 | Asherman | June 29, 1954 |
| 2,721,600 | Perryman | Oct. 25, 1955 |
| 2,806,135 | Bolsey | Sept. 10, 1957 |

FOREIGN PATENTS

| | | |
|---|---|---|
| 526,924 | Great Britain | Sept. 27, 1940 |